United States Patent
Park et al.

(10) Patent No.: US 11,368,889 B2
(45) Date of Patent: Jun. 21, 2022

(54) METHOD AND DEVICE FOR PERFORMING HANDOVER FROM WIRELESS ACCESS NETWORK TO WIFI NETWORK

(71) Applicant: Samsung Electronics Co., Ltd., Suwon-si (KR)

(72) Inventors: Daehee Park, Yongin-si (KR); Hanseok Kim, Seoul (KR); Daewoo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 154 days.

(21) Appl. No.: 16/629,157

(22) PCT Filed: Jun. 5, 2018

(86) PCT No.: PCT/KR2018/006394
§ 371 (c)(1),
(2) Date: Jan. 7, 2020

(87) PCT Pub. No.: WO2019/013452
PCT Pub. Date: Jan. 17, 2019

(65) Prior Publication Data
US 2020/0137653 A1  Apr. 30, 2020

(30) Foreign Application Priority Data
Jul. 11, 2017 (KR) .................... 10-2017-0087900

(51) Int. Cl.
*H04W 36/14* (2009.01)
*H04W 36/00* (2009.01)
(Continued)

(52) U.S. Cl.
CPC ....... *H04W 36/14* (2013.01); *H04W 36/0022* (2013.01); *H04W 36/0044* (2013.01);
(Continued)

(58) Field of Classification Search
CPC . H04W 36/14; H04W 84/12; H04W 36/0011; H04W 36/0022; H04W 36/30;
(Continued)

(56) References Cited

U.S. PATENT DOCUMENTS 9,491,674 B2  11/2016  Singh et al.
9,674,748 B2   6/2017  Gao et al.
(Continued)

FOREIGN PATENT DOCUMENTS

CN  102428680 A  4/2012
CN  103517264 A  1/2014
(Continued)

OTHER PUBLICATIONS

Intel Corporation, WLAN-3GPP access network selection based on maximum achievable rate metric, R2-131348, 3GPP TSG RAN2 Meeting #81 bis, Apr. 5, 2013, Chicago, USA.
(Continued)

*Primary Examiner* — Allahyar Kasraian
(74) *Attorney, Agent, or Firm* — Jefferson IP Law, LLP

(57) ABSTRACT

Disclosed are: a communication scheme for merging, with IoT technology, a 5G communication system for supporting a data transmission rate higher than that of a 4G system; and a system thereof. The present disclosure can be applied to intelligence services (for example, smart home, smart building, smart city, smart car or connected car, health care, digital education, retail, security and safety-related services, and the like) on the basis of 5G communication technology and IoT-related technology.

12 Claims, 7 Drawing Sheets

(51) Int. Cl.
*H04W 36/08* (2009.01)
*H04W 36/30* (2009.01)

(52) U.S. Cl.
CPC ....... *H04W 36/0088* (2013.01); *H04W 36/08* (2013.01); *H04W 36/30* (2013.01)

(58) Field of Classification Search
CPC . H04W 36/0066; H04W 36/18; H04W 36/08; H04W 88/02; H04W 36/0088; H04W 36/12; H04W 36/0044
See application file for complete search history.

(56) References Cited

U.S. PATENT DOCUMENTS

| | | | |
|---|---|---|---|
| 2006/0258356 A1* | 11/2006 | Maxwell | H04W 36/0033 455/436 |
| 2010/0128677 A1 | 5/2010 | Liu et al. | |
| 2010/0128708 A1 | 5/2010 | Liu et al. | |
| 2010/0296483 A1 | 11/2010 | Sayeedi et al. | |
| 2012/0046058 A1 | 2/2012 | Vesterinen et al. | |
| 2012/0236831 A1 | 9/2012 | Sayeedi et al. | |
| 2013/0040693 A1* | 2/2013 | Chen | H04W 36/30 455/525 |
| 2013/0242897 A1 | 9/2013 | Meylan et al. | |
| 2013/0294423 A1 | 11/2013 | Wang et al. | |
| 2014/0022932 A1 | 1/2014 | Park et al. | |
| 2014/0038612 A1* | 2/2014 | Wang | H04W 36/00837 455/436 |
| 2014/0241184 A1* | 8/2014 | Sami | H04W 36/24 370/252 |
| 2015/0092553 A1 | 4/2015 | Sirotkin et al. | |
| 2015/0327129 A1 | 11/2015 | Faccin et al. | |
| 2015/0382269 A1 | 12/2015 | Liang | |
| 2016/0073404 A1* | 3/2016 | Vutukuri | H04W 36/0066 370/329 |
| 2016/0165508 A1* | 6/2016 | Jin | H04W 36/165 370/331 |
| 2016/0183131 A1 | 6/2016 | Khawer et al. | |
| 2016/0353361 A1 | 12/2016 | Jung et al. | |
| 2017/0026884 A1 | 1/2017 | Singh et al. | |
| 2017/0048739 A1 | 2/2017 | Jeong et al. | |
| 2017/0099600 A1 | 4/2017 | Jeong et al. | |
| 2017/0156086 A1 | 6/2017 | Tomici et al. | |
| 2017/0171782 A1 | 6/2017 | Mohamed et al. | |
| 2018/0288657 A1* | 10/2018 | Stojanovski | H04W 76/28 |
| 2019/0014529 A1 | 1/2019 | Karampatsis et al. | |

FOREIGN PATENT DOCUMENTS

| | | |
|---|---|---|
| CN | 103582062 A | 2/2014 |
| CN | 103797888 A | 5/2014 |
| CN | 104303542 A | 1/2015 |
| CN | 105493556 A | 4/2016 |
| CN | 106465204 A | 2/2017 |
| CN | 106537954 A | 3/2017 |
| CN | 106576395 A | 4/2017 |
| CN | 106664620 A | 5/2017 |
| CN | 106797667 A | 5/2017 |
| KR | 10-2012-0022979 A | 3/2012 |
| KR | 10-2012-0024711 A | 3/2012 |
| KR | 10-2014-0080746 A | 7/2014 |
| KR | 10-2015-0109457 A | 10/2015 |
| KR | 10-2015-0123747 A | 11/2015 |
| KR | 10-2016-0104016 A | 9/2016 |
| WO | 2016/028201 A1 | 2/2016 |

OTHER PUBLICATIONS

Journal of Computer Research and Development No. 12, Journal of Computer Research and Development 2013 (vol. 50) General Contents, Dec. 15, 2013.
Korean Office Action dated Jul. 9, 2021, issued in Korean Application No. 10-2017-0087900.
Chinese Office Action dated Sep. 1, 2021, issued in Chinese Application No. 201880046327.9.
Chinese Notice of Allowance dated Apr. 20,202, issued in Chinese Patent Application No. 201880046327.9.

* cited by examiner

METHOD AND DEVICE FOR PERFORMING HANDOVER FROM WIRELESS ACCESS NETWORK TO WIFI NETWORK

TECHNICAL FIELD

The disclosure relates to a handover from a radio access network to a Wi-Fi network and, in particular, to an improved handover procedure for improving user-perceived communication quality.

BACKGROUND ART

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System."

Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system.

In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like.

In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology," "wired/wireless communication and network infrastructure," "service interface technology," and "security technology" have been demanded for IoT implementation, recently there has been research into a sensor network, Machine-to-Machine (M2M) communication, Machine Type Communication (MTC), and so forth. Such an IoT environment may provide intelligent Internet technology services that create new values for human life by collecting and analyzing data generated among connected things. The IoT may be applied to a variety of fields including smart home, smart building, smart city, smart car or connected car, smart grid, health care, smart appliances, and advanced medical services through convergence and combination between existing Information Technology (IT) and various industrial applications.

In line with these developments, various attempts have been made to apply the 5G communication system to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be an example of convergence between the 5G technology and the IoT technology.

An evolved S2a Mobility Over GTP (eSaMOG) technology specified by the 3rd generation partnership project (3GPP) defines a handover technology between a 3GPP radio communication network and a wireless fidelity (Wi-Fi) network. This technology makes it possible to hand over a terminal from a 3GPP radio communication network to a Wi-Fi network using a proxy gateway (P-GW) as an anchoring point.

DISCLOSURE OF INVENTION

Technical Problem

The 3GPP specifies a handover procedure between a 3GPP radio communication network and a Wi-Fi network via eSaMOG. In this handover procedure, if a terminal attached to a radio communication network discovers an accessible trusted Wi-Fi network, an ongoing session between the terminal and the radio communication network can be handed over to the Wi-Fi network such that an application runs seamlessly across the 3GPP radio network and the Wi-Fi network with the same IP address. This procedure uses a single connection mode (SCM) or a multi-connection mode (MCM) as specified in 3GPP TS 23.402 Architecture enhancements for non-3GPP accesses (3GPP, Release 12). A terminal may use a Wi-Fi network for a single access point network (APN) session in SCM and multiple APN sessions in MCM.

According to a normal handover procedure specified in the 3GPP eSaMOG, if it becomes possible to connect to a Wi-Fi network, the terminal initiates a handover to the Wi-Fi network immediately without any network status checking procedure. A problem arises in that it is difficult to check for the quality of a Wi-Fi network (external disconnection, available data rate, etc.) before connecting to the Wi-Fi network.

In particular, if the terminal cannot normally communicate with the Wi-Fi network after being handed over from the 3GPP radio communication network to the Wi-Fi network, this may make the user of the terminal feel uncomfortable about network disconnection and involves a cost of handing the corresponding session back over to the LTE.

The objects of the disclosure are not limited to the aforesaid, and other objects not described herein will be clearly understood by those skilled in the art from the descriptions below.

Solution to Problem

According to an embodiment of the disclosure, a handover execution method of a terminal in a mobile communication system includes establishing a new connection to a second network while maintaining a connection to a first network through which communication is in progress and measuring a quality of the second network via the new connection to the second network.

According to an embodiment of the disclosure, a terminal in a mobile communication system includes a transceiver configured to transmit and receive signals and a controller configured to control to establish a new connection to a second network while maintaining a connection to a first network through which communication is in progress and measure a quality of the second network via the new connection to the second network.

According to an embodiment of the disclosure, a method of a network node forming a second network in a mobile communication system includes receiving a request for establishing a new connection to a second network from a terminal maintaining a connection to a first network and communicating via the first network and allowing the terminal to measure a quality of the second network via the new connection of the terminal.

According to an embodiment of the disclosure, a network node forming a second network in a mobile communication system includes a transceiver configured to transmit and receive signals and a controller configured to control to receive a request for establishing a new connection to a second network from a terminal maintaining a connection to a first network and communicating via the first network and allow the terminal to measure a quality of the second network via the new connection of the terminal.

Advantageous Effects of Invention

The approaches of the disclosed embodiments are advantageous in terms of allowing a quality of a Wi-Fi network to be checked before a handover from a radio communication network to the Wi-Fi network such that an ongoing session with the radio communication network is handed over to the Wi-Fi network at a time point when a quality is secured. The approaches of the disclosed embodiments are also advantageous in terms of improving a terminal user's perceived quality by minimizing network disconnection. The approaches of the disclosed embodiments are also advantageous in terms of providing a terminal user with a seamless service.

MODE FOR THE INVENTION

Figure 1:
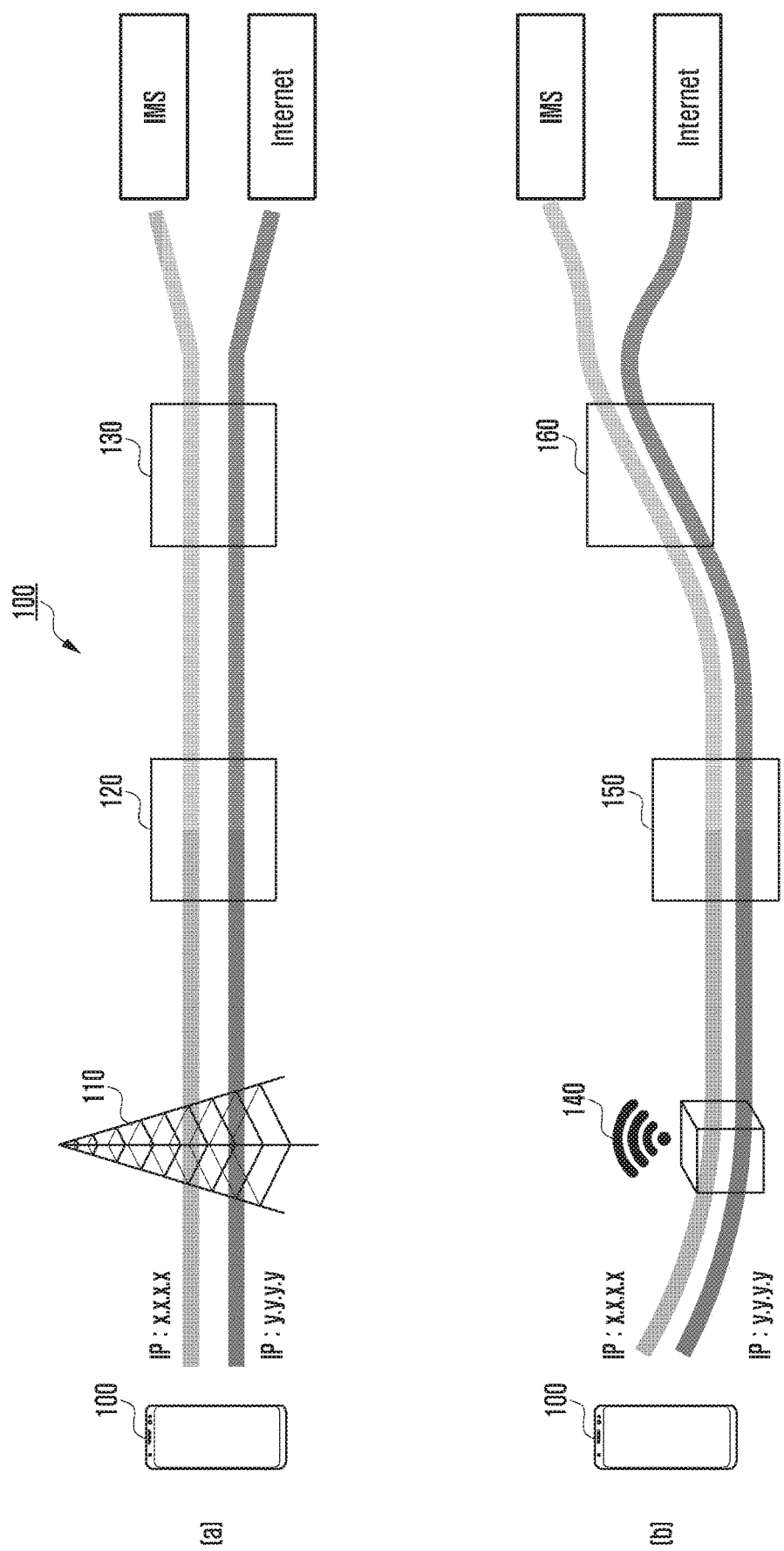
FIG. 1 is a diagram illustrating a procedure of handover from a radio communication network to a Wi-Fi network in a 3 GPP communication system.

Exemplary embodiments of the disclosure are described in detail with reference to the accompanying drawings. The same reference numbers are used throughout the drawings to refer to the same or like parts. Detailed descriptions of well-known functions and structures incorporated herein may be omitted to avoid obscuring the subject matter of the disclosure.

Detailed descriptions of technical specifications well-known in the art and unrelated directly to the disclosure may be omitted to avoid obscuring the subject matter of the disclosure. This aims to omit unnecessary description so as to make clear the subject matter of the disclosure.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the disclosure and methods of accomplishing the same may be understood more readily by reference to the following detailed descriptions of exemplary embodiments and the accompanying drawings. The disclosure may, however, be embodied in many different forms and should not be construed as being limited to the exemplary embodiments set forth herein; rather, these exemplary embodiments are provided so that this disclosure will be thorough and complete and will fully convey the concept of the disclosure to those skilled in the art, and the disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or they may be performed in reverse order according to their functions.

According to various embodiments of the disclosure, the term "module," means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card.

FIG. 1 is a diagram illustrating a procedure 100 of handover from a radio communication network to a Wi-Fi network in a 3GPP communication system.

The 3GPP defines a technology of handover between a 3GPP radio communication network and a non-trusted non-3GPP network using s2b and s2c and between a 3GPP radio communication network and a trusted wireless network via S2a Mobility Over GTP/evolved S2a Mobility Over GTP (S2MOG/eSaMOG) using s2a. This technology makes it possible to hand over a terminal from a 3GPP radio communication network to a Wi-Fi network using a proxy gateway (P-GW) as an anchoring point.

In a handover procedure based on the above technology, if a terminal 100 attached to a radio communication network (e.g., non-Wi-Fi network) discovers an accessible trusted Wi-Fi network 140, an ongoing session between the terminal and the radio communication network can be handed over to the Wi-Fi network as shown in part (a) of FIG. 1. In this case, the terminal maintains the IP address used in the 3GPP radio communication network even in the Wi-Fi network as shown in part (b) of FIG. 1 such that an application can run seamlessly.

In detail, the terminal 100 connects to a base station 100 (eNB), which provides the terminal with an Internet service and/or IMS service via a serving gateway (S-GW) 120 and a proxy gateway (P-GW) 130. The terminal 100 may be handed over to a Wi-Fi access point (AP) 140 to receive the ongoing Internet service and/or IMS service via a trusted wireless access gateway (TWAG) or an evolved packet data gateway (ePDG) 150 and a P-GW 160.

As described above, if the terminal is handed over to the Wi-Fi network that is not in a state available for normal communication, this may make the user of the terminal feel uncomfortable about network disconnection and involves an unnecessary overhead and cost of handing the corresponding session back over to the radio communication network.

The disclosed embodiments propose various approaches to solve the above problems. According to a disclosed embodiment, the terminal may establish a temporary session with a Wi-Fi network to check for Wi-Fi quality before handing over the session with a base station (eNB). In this case, the terminal may be actually transmitting a packet during the temporary session even to measure connection quality to the Internet or EPC network as well as checking for Wi-Fi network quality, thereby acquiring more accurate quality information. The terminal initiates a handover of the session with the base station of the radio communication network to the Wi-Fi network only when the checked Wi-Fi quality is equal to or higher than a predetermined level, thereby minimizing network disconnection perceivable by the terminal user.

Figure 2:
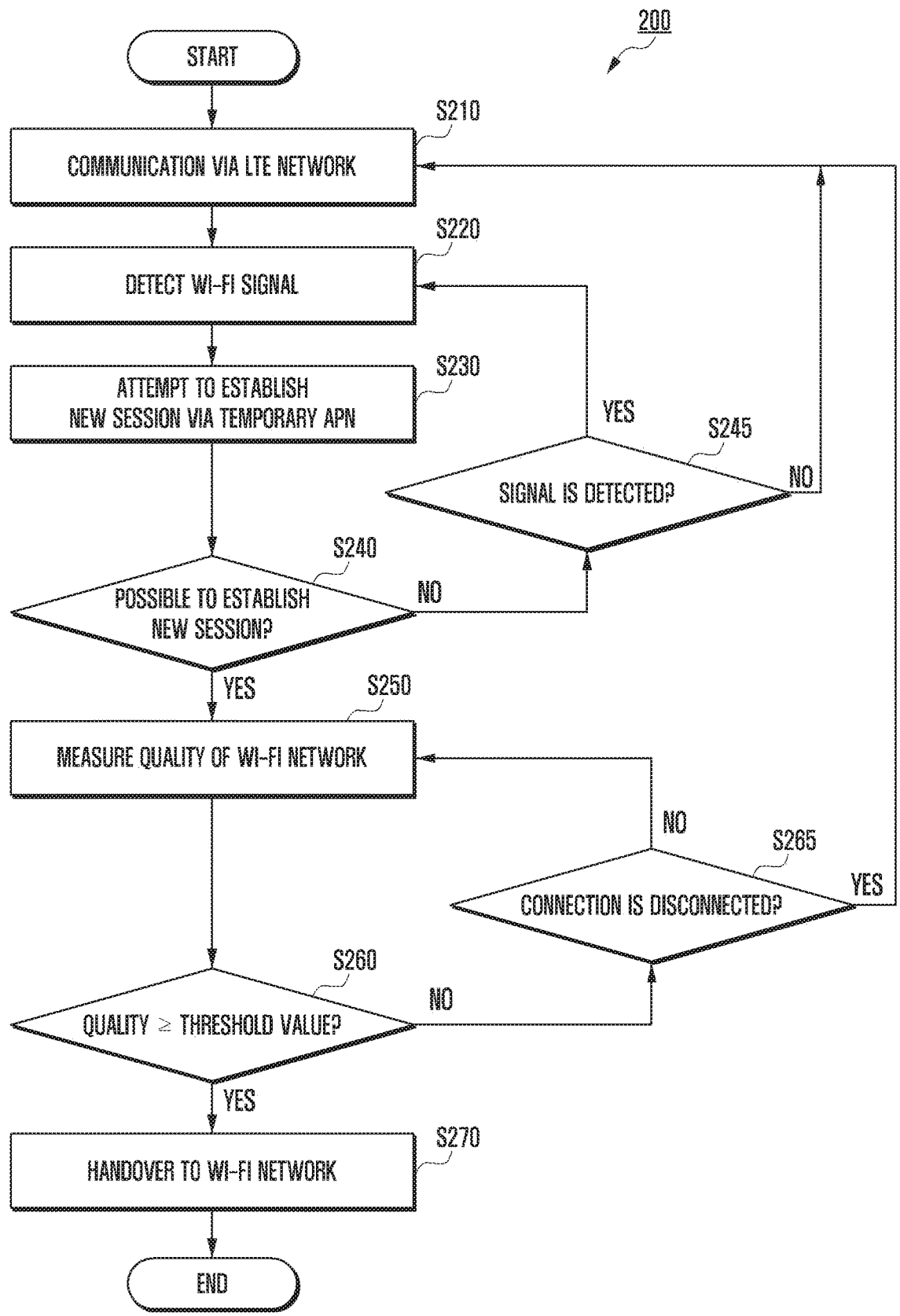
FIG. 2 is a flowchart illustrating a handover procedure according to an embodiment of the disclosure.

The disclosed embodiments are described with reference to FIGS. 2 and 3. FIG. 2 is a flowchart illustrating a handover procedure 200 according to an embodiment of the disclosure; the embodiment of FIG. 2 is directed to establishing a temporary session to a specific APN.

First, the terminal is assigned an APN via an LTE network (or radio communication network) and establishes a session to communicate at step S210. Here, the terminal may receive, at step S220, a beacon signal equal in strength to or greater than a predetermined level from a Wi-Fi AP of which examples include a trusted Wi-Fi AP or a non-trusted Wi-Fi AP.

Upon receipt of the beacon signal, the terminal configures a temporary APN with the Wi-Fi AP and establish a new session via the temporary APN at step S230. If it is determined at step S240 that it is impossible to establish a new session, the terminal continues monitoring at step S245 to detect a beacon signal at step S220 while keeping the communication via the radio communication network at step S210 until a beacon signal is detected.

According to a disclosed embodiment, the UE maintains the APN of the radio communication network while establishing a new session with the temporary AP network. That is, the terminal maintains the session with the old APN before the handover to the Wi-Fi network is finally determined, attempting to create a temporary APN to the Wi-Fi network.

The terminal measures a quality of the Wi-Fi network at step S250 via the temporary APN session established with the Wi-Fi network. In detail, the terminal may actually transmit a data packet (e.g., ping) to determine whether the Wi-Fi network is available for normal communication and, if so, measure a quality of the Wi-Fi network (e.g., available data rate and external disconnection of the network); the configured temporary ANP and new session may only allow for a specific message to be transmitted for quality measurement in a restrictive manner.

If it is determined at step S260 that the measured Wi-Fi network quality is equal to or greater than a threshold value, the terminal may perform handover to the Wi-Fi network at step S270. Performing handover means that the terminal moves the APN in use on the LTE network and the session established with the base station of the radio communication network to the Wi-Fi network. That is, the IP address assigned to the radio communication network is moved to the Wi-Fi network. If the quality is equal to or greater than the threshold value, this may mean that the Wi-Fi network quality is equal to or greater than a predetermined threshold value, the Wi-Fi network quality is equal to or greater than that of the radio communication network, or a preference by using the Wi-Fi network quality and the radio communication network quality.

If it is determined at step S260 that the measured Wi-Fi network quality is less than the threshold value, the terminal determines at step 265 whether the connection to the Wi-Fi AP is to be disconnected and, if not, continues Wi-Fi network quality measurement at step S250. If it is determined at step S265 that the connection to the Wi-Fi AP is to be disconnected, the terminal continues the communication via the radio communication network.

Figure 3:
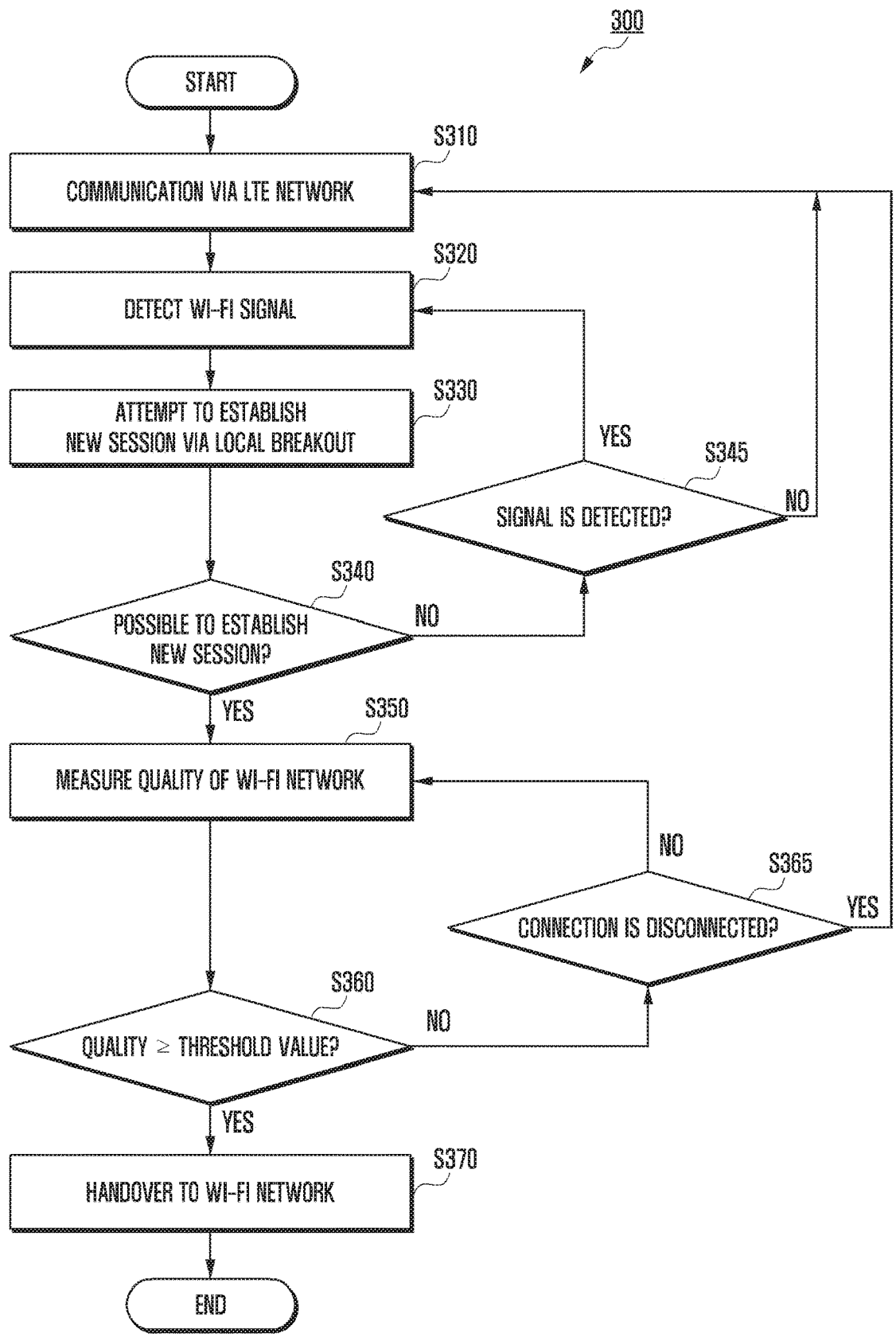
FIG. 3 is a flowchart illustrating a handover procedure according to an embodiment of the disclosure.

FIG. 3 is a flowchart illustrating a handover procedure 300 according to an embodiment of the disclosure. The embodiment of FIG. 3 is directed to establishing a temporary session via local breakout. The local breakout is a technique which allows a Wi-Fi AP to connect to a data network directly without intervention of a core network such that data transmitted by a terminal is delivered to the data network via the Wi-Fi AP without passing through the core network.

First, the terminal is assigned an APN via an LTE network (or radio communication network) and establishes a session to communicate at step S310. Here, the terminal may receive, at step S320, a beacon signal equal in strength to or greater than a predetermined level from a Wi-Fi AP of which examples include a trusted Wi-Fi AP or a non-trusted Wi-Fi AP of a 3GPP system.

Upon receipt of the beacon signal, the terminal configures a new session via local breakout at step S330. This embodiment differs from the embodiment of FIG. 2 in that the terminal uses the local breakout technique and that it may be predetermined according to a request from the terminal or a policy of a network operator, instead of creating a temporary APN. If it is determined at step S340 that it is impossible to establish a new session, the terminal continues monitoring at step 345 to detect a beacon signal at step S320 while keeping the communication via the radio communication network at step S310 until a beacon signal is detected.

This embodiment is identical with the embodiment of FIG. 2 in that the terminal maintains the APN of the radio communication network with the exception that the new session is established via local breakout. That is, the terminal maintains the session established with the base station before the handover to the Wi-Fi network is finally determined.

The terminal measures a quality of the Wi-Fi network at step S350. In detail, the terminal may measure a signal sensitivity of the Wi-Fi network or network quality to the Internet or EPC. Here, the terminal may obtain the network quality by measuring the network quality by itself or receiving the network quality even of the Internet or EPC from the Wi-Fi AP. If it is determined at step S360 that the measured Wi-Fi network quality is equal to or greater than a threshold value, the terminal may perform handover to the Wi-Fi network at step S370. Performing handover means that the terminal moves the APN in use on the LTE network and the session established with the base station of the radio communication network to the Wi-Fi network. Likewise, the IP address assigned to the radio communication network is moved to the Wi-Fi network. If the quality is equal to or greater than the threshold value, this may mean that the Wi-Fi network quality is equal to or greater than a predetermined threshold value, the Wi-Fi network quality is equal to or greater than that of the radio communication network, or a preference using the Wi-Fi network quality and the radio communication network quality.

If it is determined at step S360 that the measured Wi-Fi network quality is less than the threshold value, the terminal determines at step 365 whether the connection to the Wi-Fi AP is disconnected and, if not, continues Wi-Fi network quality measurement at step S350. If it is determined at step S365 that the connection to the Wi-Fi AP is to be disconnected, the terminal continues the communication via the radio communication network.

Figure 4:
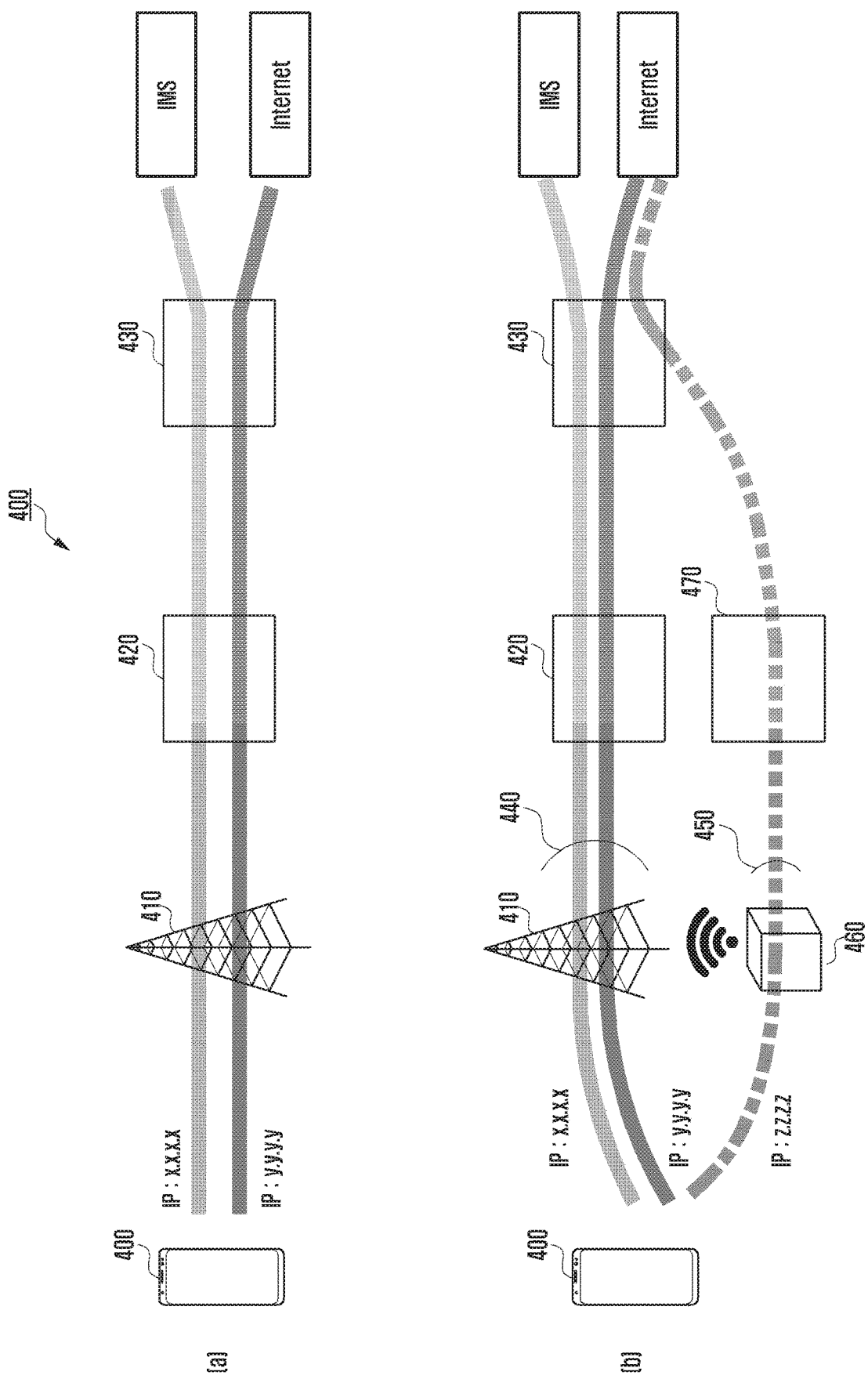
FIG. 4 is a diagram illustrating a handover procedure according to an embodiment of the disclosure.
Figure 5:
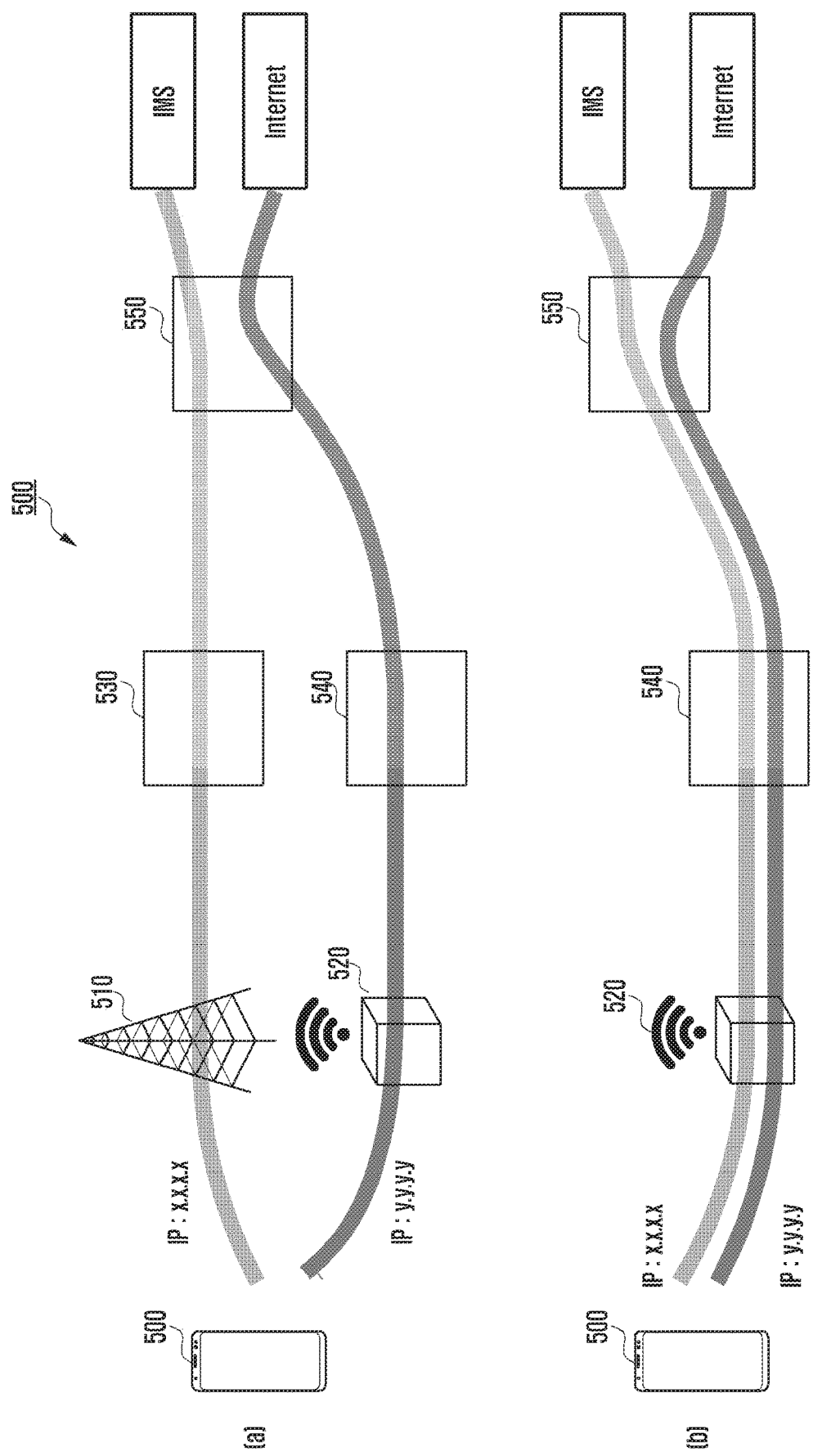
FIG. 5 is a diagram illustrating a handover procedure according to another embodiment of the disclosure.

FIGS. 4 and 5 are diagrams illustrating handover procedures according to disclosed embodiments. Descriptions are made of the Wi-Fi network quality measurement procedure 400 with reference to FIG. 4 and the procedure for handover to the Wi-Fi network according to a quality measurement result. Although the terminal has two PDN connections (IP:x.x.x.x for PDN connection for IMS service and IP:y.y.y.y for PDN connection for Internet service) in FIGS. 4 and 5 for convenience of explanation, it is obvious that the proposed approaches can be applied to the cases where the terminal has less or more PDN connections or IP addresses.

In part (a) of FIG. 4, the terminal 400 is assigned an IP address to receive an IMS service (IP: x.x.x.x) and an Internet service (IP: y.y.y.y) from a P-GW 430 via a base station 410 and an S-GW 420. In part (b) of FIG. 4, if the terminal 400 receives a beacon signal from a Wi-Fi AP 460, it configures a temporary APN 450 with the Wi-Fi network and establish a new session. During this procedure, the terminal configures the temporary APN 450 while maintaining the APN and session 440 that was previously established with the radio communication network. The terminal is assigned a temporary IP address (IP: z.z.z.z) through the new session established via a Wi-Fi AP 460 and a TWAG and/or ePDG 370 and measures Wi-Fi network quality to determine whether to perform handover to the Wi-Fi network. Obviously, it may also be possible for the terminal to receive Wi-Fi connection quality information of the Wi-Fi network via local breakout as described with reference to FIG. 3, which is unlike the embodiment of FIG. 4.

If the Wi-Fi network quality is good enough, the terminal 500 hands over the IP for the Internet service to the Wi-Fi network so as to continue receiving the service seamlessly as shown in part (a) of FIG. 5. In parts (a) and (b) of FIG. 5, the network nodes (or entities) 510, 520, 530, 540, and 550 may denote a base station, a Wi-Fi AP, a S-GW, a TWAG/ePDG, and a P-GW, respectively.

If the Wi-Fi network quality is higher than a threshold value for handover in a situation of part (a) of FIG. 5, the terminal may hand over an IP address for the IMS service to the Wi-Fi network to continue receiving the service as shown in part (b) of FIG. 5. Instead of this step-wise procedure, the terminal may hand over both the IP addresses for the Internet and IMS services to the Wi-Fi network at one time as shown in part (b) of FIG. 5. If the terminal determines that the Wi-Fi network quality becomes lower than the threshold value, it may hand over some or all of the IP addresses back to the radio communication network.

The proposed approaches of the disclosed embodiments are capable of minimizing communication disconnection in a procedure of terminal handover from a radio communication network to a Wi-Fi network, resulting in improvement of user-perceived communication quality.

Figure 6:
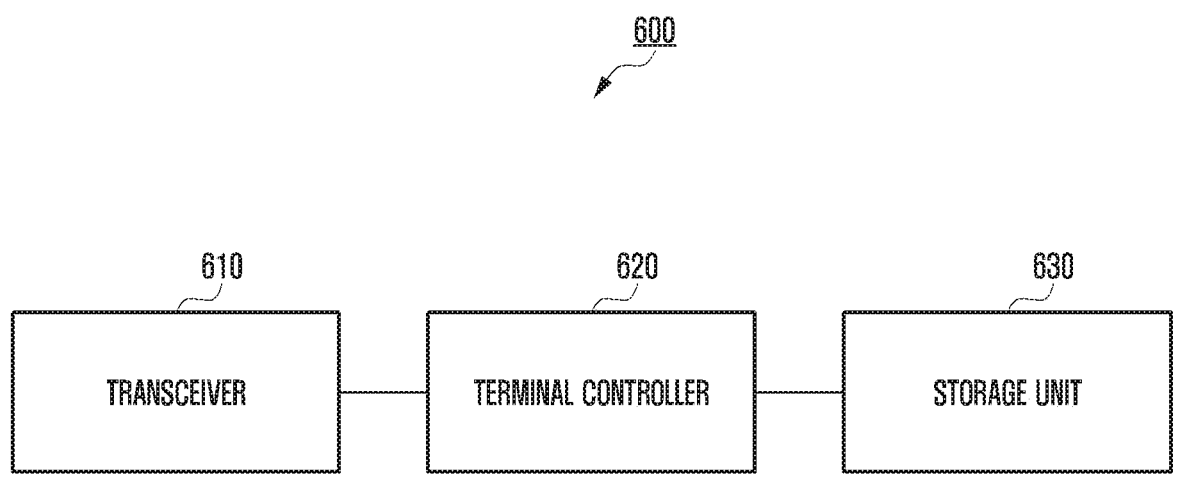
FIG. 6 is a block diagram illustrating a configuration of a terminal according to an embodiment of the disclosure.

FIG. 6 is a block diagram illustrating a configuration 600 of a terminal according to an embodiment of the disclosure.

FIG. 6 is a block diagram illustrating a configuration of a terminal according to an embodiment of the disclosure. In reference to FIG. 6, the terminal may include a transceiver 610, a terminal controller 620, and a storage unit 630. In this embodiment, the terminal controller 620 may be defined as a circuit, an application-specific integrated circuit, or at least one processor.

The transceiver 610 communicates signals with a network entity or network node. For example, the transceiver 610 may receive a beacon signal from a Wi-Fi AP in the middle of communication via a radio communication network. The transceiver 610 may be implemented in the form of an RF unit including a modem.

The terminal controller 620 may control overall operations of the terminal as proposed in the disclosed embodiments. For example, the terminal controller 620 may control the transceiver 610 and the storage unit 630 to perform the operations described in the disclosed embodiments with reference to the accompanying drawings. In detail, the terminal controller 620 may create a temporary APN, upon receipt of the beacon signal from the Wi-Fi AP, and establish a new session via local breakout to perform handover to the Wi-Fi network based on the quality of the Wi-Fi network.

The storage unit 630 may store at least one of information transmitted/received by the transceiver 610 and information generated by the terminal controller 620.

Figure 7:
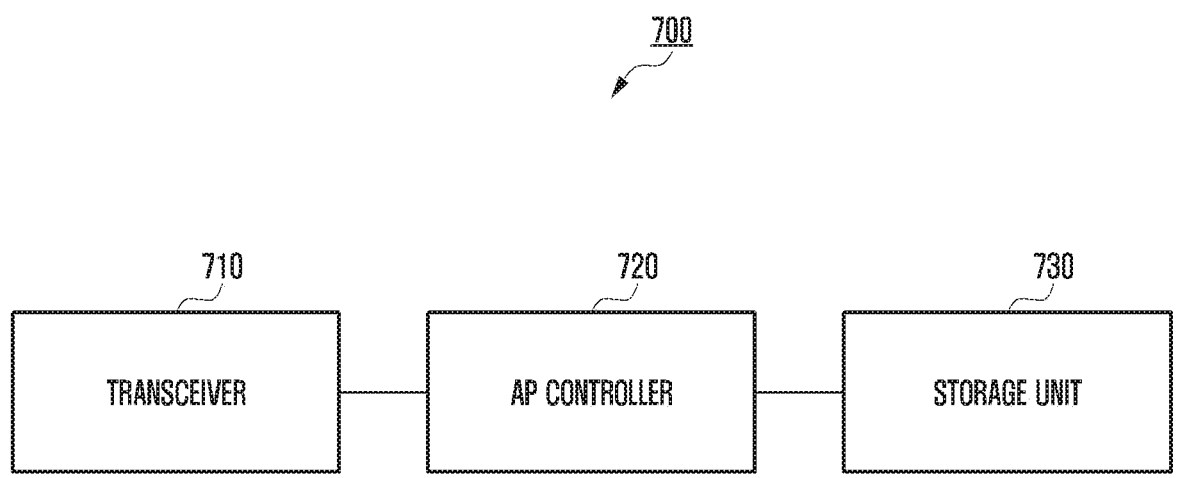
FIG. 7 is a block diagram illustrating a configuration of a Wi-Fi access point (AP) according to an embodiment of the disclosure.

FIG. 7 is a block diagram illustrating a configuration 700 of a Wi-Fi access point (AP) according to an embodiment of the disclosure. In reference to FIG. 7, the terminal may include a transceiver 710, an AP controller 620, and a storage unit 730. In this embodiment, the AP controller 620 may be defined as a circuit, an application-specific integrated circuit, or at least one processor.

The transceiver 710 may communicate signals with another network entity or network node. For example, the transceiver 710 may receive a message requesting for establishment of a new session from a terminal. The transceiver 710 may be implemented in the form of an RF unit including a modem.

The AP controller 620 may control overall operations of the AP as proposed in the disclosed embodiments. For example, the AP controller 620 may control the transceiver 710 and the storage unit 730 to perform the operations described in the disclosed embodiments with reference to the accompanying drawings. In detail, the AP controller 620 may establish a new session in response to a message requesting creation of a temporary APN from the terminal or directly via the Internet in a local breakout mode. The AP controller 620 may also control to provide the terminal with a service through a PND connection handed over from a radio communication network upon receipt of a handover request from the terminal.

The storage unit 730 may store at least one of information transmitted/received by the transceiver 710 and information generated by the AP controller 620.

Although the embodiments of the disclosure have been described using specific terms, the specification and drawings are to be regarded in an illustrative rather than a restrictive sense in order to help understand the disclosure. It is obvious to those skilled in the art that various modifications and changes can be made thereto without departing from the broader spirit and scope of the disclosure.

The invention claimed is:

1. A method performed by a terminal in a mobile communication system, the method comprising:
   establishing, during a communication with a first network, a second connection to a second network by using a temporary access point name (APN) while maintaining a first connection to the first network;
   transmitting, to the second network via the second connection, a message restrictively allowed for the temporary APN;
   performing a handover for moving an internet protocol (IP) address of the first connection to the second network, in case that a quality of the second network as a result of the transmitting of the message is greater than or equal to a threshold value;
   performing the communication continuously via the first connection while measuring the quality of the second network and until the second connection using the temporary APN is released, in case that the quality of the second network as the result of the transmitting of the message is less than the threshold value; and
   performing the communication via the first connection after the second connection is released.

2. The method of claim 1, wherein the first network is a cellular network, and the second network is a wireless fidelity (Wi-Fi) network.

3. The method of claim 1,
   wherein the quality of the second network is measured by comparing the quality of the second network to a predetermined threshold value or a quality of the first network, and
   wherein the quality of the second network is measured from a signal sensitivity of the second network or a quality-related parameter received from the second network.

4. A terminal in a mobile communication system, the terminal comprising:
   a transceiver configured to transmit or receive a signal; and
   a controller configured to:
      establish, during a communication with a first network, a second connection to a second network by using a temporary access point name (APN) while maintaining a first connection to the first network,
      transmit, to the second network via the second connection, a message restrictively allowed for the temporary APN,
      perform a handover for moving an internet protocol (IP) address of the first connection to the second network, in case that a quality of the second network as a result of the transmitting of the message is greater than or equal to a threshold value,
      perform the communication continuously via the first connection while measuring the quality of the second network and until the second connection using the temporary APN is released, in case that the quality of the second network as the result of the transmitting of the message is less than the threshold value, and
      perform the communication via the first connection after the second connection is released.

5. The terminal of claim 4, wherein the first network is a cellular network, and the second network is a wireless fidelity (Wi-Fi) network.

6. The terminal of claim 4,
   wherein the quality of the second network is measured by comparing the quality of the second network to a predetermined threshold value or a quality of the first network, and
   wherein the quality of the second network is measured from a signal sensitivity of the second network or a quality-related parameter received from the second network.

7. A method performed by a network entity associated with a second network in a mobile communication system, the method comprising:
   receiving, from a terminal performing a communication with a first network via a first connection, a request for establishing a second connection which is a new connection with the second network by using a temporary access point name (APN); and
   receiving, from the terminal via the second connection, a message restrictively allowed for the temporary APN,
   wherein a handover for moving an internet protocol (IP) address of the first connection to the second network is performed, in case that a quality of the second network based on the message is greater than or equal to a threshold value,
   wherein the communication is performed continuously via the first connection while measuring the quality of the second network and until the second connection using the temporary APN is released, in case that the quality of the second network based on the message is less than the threshold value, and
   wherein the communication is performed via the first connection after the second connection is released.

8. The method of claim 7,
   wherein the first network is a cellular network, and the second network is a wireless fidelity (Wi-Fi) network.

9. The method of claim 7, wherein the quality of the second network is measured by comparing the quality of the second network to a predetermined threshold value or a quality of the first network, and wherein the quality of the second network is measured from a signal sensitivity of the second network or a quality-related parameter transmitted to the terminal.

10. A network entity associated with a second network in a mobile communication system, the network comprising:

a transceiver configured to transmit or receive a signal; and a controller configured to:

receive, from a terminal performing a communication with a first network via a first connection, a request for establishing a second connection which is a new connection with the second network by using a temporary access point name (APN), and receive, from the terminal via the second connection, a message restrictively allowed for the temporary APN, wherein a handover for moving an internet protocol (IP) address of the first connection to the second network is performed, in case that a quality of the second network based on the message is greater than or equal to a threshold value, wherein the communication is performed continuously via the first connection while measuring the quality of the second network and until the second connection using the temporary APN is released, in case that the quality of the second network based on the message is less than the threshold value, and wherein the communication is performed via the first connection after the second connection is released.

11. The network entity of claim 10, wherein the first network is a cellular network, and the second network is a wireless fidelity (Wi-Fi) network.

12. The network entity of claim 10, wherein the quality of the second network is measured by comparing the quality of the second network to a predetermined threshold value or a quality of the first network, and wherein the quality of the second network is measured from a signal sensitivity of the second network or a quality-related parameter transmitted to the terminal.

* * * * *